United States Patent
Shah et al.

(10) Patent No.: US 9,835,259 B2
(45) Date of Patent: Dec. 5, 2017

(54) TOP ENTRY TRUNNION BALL VALVE FOR SAFE IN-LINE MAINTENANCE AND METHOD TO FACILITATE SUCH MAINTENANCE

(71) Applicants: Amit Shah, Mumbai (IN); Ajit Kothadia, Mumbai (IN)

(72) Inventors: Amit Shah, Mumbai (IN); Ajit Kothadia, Mumbai (IN)

( * ) Notice: Subject to any disclaimer, the term of this patent is extended or adjusted under 35 U.S.C. 154(b) by 0 days.

(21) Appl. No.: 15/163,699

(22) Filed: May 25, 2016

(65) Prior Publication Data

US 2017/0299070 A1    Oct. 19, 2017

(30) Foreign Application Priority Data

Apr. 16, 2016   (IN) .............................. 201621013307

(51) Int. Cl.
  *F16K 5/06*    (2006.01)
  *F16K 27/06*   (2006.01)
  *F16K 5/20*    (2006.01)

(52) U.S. Cl.
  CPC ............ *F16K 5/0636* (2013.01); *F16K 5/201* (2013.01); *F16K 27/067* (2013.01); *Y10T 137/0508* (2015.04)

(58) Field of Classification Search
  CPC ...... F16K 5/0636; F16K 27/067; F16K 5/201; Y10T 137/0508; Y10T 137/7668; Y10T 137/6154; Y10T 137/6045
  USPC ..................... 137/15.22, 454.6, 327, 315.21; 251/315.01, 315.08–315.1, 315.12
  See application file for complete search history.

(56) References Cited

U.S. PATENT DOCUMENTS

| | | | | |
|---|---|---|---|---|
| 3,171,429 A | * | 3/1965 | Sturmer | F16K 5/201 251/315.12 |
| 3,934,606 A | * | 1/1976 | Matthews | F16K 5/204 137/454.6 |
| 4,151,855 A | * | 5/1979 | Levin | F16K 5/0636 137/15.22 |
| 4,175,577 A | * | 11/1979 | Kacal | F16K 5/0636 251/315.12 |
| 4,262,691 A | * | 4/1981 | Kacal | F16K 5/0626 251/315.12 |
| 4,266,566 A | * | 5/1981 | Kacal | F16K 5/201 137/316 |
| 4,388,945 A | * | 6/1983 | Johnson | F16K 5/0636 251/315.12 |
| 4,390,039 A | * | 6/1983 | Johnson | F16K 5/201 251/315.08 |

(Continued)

*Primary Examiner* — John Bastianelli

(57) ABSTRACT

A top entry trunnion mounted rotary ball valve defining a main valve body having an upstream and a downstream ball seat assembly, the ball seat assemblies further including a soft insert seal, a ball seat, a seat retainer and a plurality of compression springs in between the ball seat and the seat retainer. A guiding groove on a cylindrical surface of each of the ball seats, having a first end and a second end at an axial distance equal to or more than a measure of retraction required so as to get a mechanical clearance to remove or assemble the ball member. Each ball seat is retracted in a recess against a force Fc of the compression springs and the mechanical clearance is created between the ball member and the soft insert seal, to remove or assemble the ball member and or any component from inside the valve body.

12 Claims, 15 Drawing Sheets

(56) References Cited

U.S. PATENT DOCUMENTS

| | | | | |
|---|---|---|---|---|
| 4,566,482 A * | 1/1986 | Stunkard | ............... | F16K 5/0636 |
| | | | | 251/315.08 |
| 4,637,421 A * | 1/1987 | Stunkard | ............... | F16K 5/0636 |
| | | | | 251/315.12 |
| 4,718,444 A * | 1/1988 | Boelte | ................... | F16K 5/0636 |
| | | | | 137/15.22 |
| 6,681,793 B2 * | 1/2004 | Mike | .................... | F16K 5/0636 |
| | | | | 137/15.22 |
| 7,267,323 B1 * | 9/2007 | O'Callaghan | ......... | F16K 5/0636 |
| | | | | 251/163 |

* cited by examiner

TOP ENTRY TRUNNION BALL VALVE FOR SAFE IN-LINE MAINTENANCE AND METHOD TO FACILITATE SUCH MAINTENANCE

The following specification particularly describes the invention and the manner in which it is to be performed.

FIELD OF INVENTION

The present invention relates to a rotary ball valve used for fluid flow management. Particularly, the invention relates to a top-entry trunnion mounted ball valve and more particularly to a top entry trunnion mounted rotary ball valve which is maintainable particularly on line.

BACKGROUND OF INVENTION

Rotary ball valves are known for fluid flow control. They are provided along a pipeline for enabling and stopping fluid flow as required.

One of the known designs of ball valve is with two or three piece valve body structures, primarily for ease of assembling and disassembly. Such designs are prone to leakage at valve body joints. Also, valve body joints are the weakest areas which decide the capacity of such ball valves for withstanding in-line fluid pressure stresses. More importantly, such valves are not conducive to repair and maintenance and need to be removed from pipe line, thus increasing downtime and cost of maintenance.

Top entry ball valves are generally made of single piece valve body within which is movably located a ball member having a through passage. The ball member has lower end trunnion housed in the valve body and upper trunnion housed in the valve cover. The stem is connected to the ball member in any suitable manner. Trunnion mounted ball valves are provided with floating ball seat assemblies which are movable linearly within the valve body and which establish sealing engagement with the spherical sealing surface of the ball member. The ball seats have tubular grooves to receive the soft seals. Top entry trunnion type ball valves have been in use for a considerable period of time and are considered to minimize many of the undesirable features of ball valves having two or three piece sectioned valve body structures. The advantages of top entry ball valves include a one piece valve body structure to withstand line stresses with no valve body joints for possibility of leakage. Also they are not necessarily required to be removed from the pipe line for maintenance.

In trunnion mounted ball valves, two ball seats are oppositely located in ball seat recesses in the valve body at each side of the ball member, being axially aligned with ball and valve body flow passages. The ball seats are preloaded against the sealing surface of the valve ball by the force of various types of springs positioned behind the ball seats. This spring preload is required to create initial sealing contact of the ball seats against the ball member for further line pressure responsive ball seat sealing. The springs are housed in the Seat retainer which is housed in the cylindrical recess in the valve body.

Because of the ball seats are under spring preload condition, it is necessary to provide some means to retract the ball seats to create and maintain the clearance between the ball seats and the ball member so that the ball member can be easily inserted or removed from the assembly without damaging the spherical sealing surfaces of the ball seats and the ball member by any obstructing conditions.

There are disclosures for easy removal and insertion of ball member and other internal parts for on-site and in-line maintenance of top entry trunnion mounted valves.

U.S. Pat. No. 4,637,421A discloses an in-line repairable top entry ball valve. The ball/ball seat spacers form sealing surfaces at one axial end for sealing engagement with the ball member and sealing surfaces at the opposite axial end for sealing engagement with the ball seats and in spherically concentric relation with the ball to thus permit installation and removal of the ball/ball seat spacers in an arcuate motion about the spherical surface of the ball. When ball/ball seat spacer is removed, a gap created between the ball seat and the ball, and the ball member can be removed. After repair and or maintenance of inner parts of valve, the ball is inserted and the gap between the ball seat and the ball is again filled by inserting the ball/ball seat spacer.

U.S. Pat. No. 4,175,577 discloses means and method for in-line removal of ball seats in ball valves, which includes a separate cam tool inserted between the ball and the ball seats after removal of the cover plate. The cam tool is positioned within the bore of the ball which has been partially rotated from the full open position, and upon a return rotation of the ball with the cam tool therein to a full open position an adjacent spring urged ball seat is cammed away from the ball to a retracted position. A ball seat retainer is then actuated to hold the ball seat in the retracted position. The cam tool is then utilized in a similar manner to cam the other opposite ball seat in retracted position. The ball may then be removed with the ball seats for replacement or repair as desired.

U.S. Pat. No. 4,388,945 A discloses Valve assembly and disassembly device. In one embodiment a conical ended pin is described which causes camming surface between the pin and ball seat. After removal of the top cover, the conical ended pin is inserted in indexed holes in the housing and as pin advances in the gap between the ball and the ball seat, the ball seat retracts against spring force. In another embodiment, the ends of the pins are teardrop shaped. After the pins are inserted, they are rotated 90° causing ball seat retraction by the larger diameter of the pin. The indexing holes for the insertion of pin are made in the interior part of the housing needing no puncturing of housing or cover.

A similar ball seat retraction is evidenced in U.S. Pat. No. 4,390,039 titled "Valve assembly and disassembly device".

U.S. Pat. No. 4,566,482A/EP 0207755 A2 titled "Top entry trunnion ball valve" discloses ball seat retraction by camming between the ball seat and the bearing seat. Rotation of a bolt of lower trunnion moves the bearing seat upward direction resulting in retracting movement of both ball seat members by their interacting with cam surfaces of the bearing seat. The bearing seat then occupies place between the ball seats and the ball seats stay locked in retracted position.

In U.S. Pat. No. 4,262,691 A entitled "Cam means for ball valve ball seats" the camming surfaces are formed between the cam pins directly mounted on the ball member and the ball 1 seat. A removable stop engages and blocks rotation of the ball member past its fully opened and fully closed positions and the cams engage the seat rings only after the stop is removed and the ball member is rotated past its normal stroke and beyond fully opened or fully closed positions.

U.S. Pat. No. 6,681,793 B2/U.S. Pat. No. 3,934,606 disclose another Ball seat construction. Camming surfaces are formed between the ball seat flange and the plate which are coupled to top and bottom shoulders of the trunnion of ball member to fully retract the spring-biased valve ball seat.

The retraction tool can be inserted to hold the ball seats in position. For insertion of the holding tool access is provided by creating an additional opening on the main housing.

U.S. Pat. No. 3,934,606A titled "Cam locked ball valve" discloses a trunnion mounted ball valve with cam plates mounted on the stem axis. Cam followers on the ball seats engage in cam slots in the plates to move the ball seats positively into firm engagement with the ball at the open and closed positions thereof and retract them free of the ball as it is moved between those positions. The ball seats slide axially in slide rings which are threaded into the valve body around the flow passage. The valve ball, ball seats, and slide rings may be removed as a unit through the valve top opening.

U.S. Pat. No. 3,171,429, titled "Valve with spherical plug" discloses a ball valve in which cams are positioned on the ball member to engage bushings or carriers for the ball seats.

While there are several other disclosures to retract the ball seat and retain in retracted position, there is scope to simplify the retraction method for top entry trunnion mounted rotary valves in construction and cost, with reduced possibilities of mal function, damage to ball member and inadvertent locking, and avoid additional weaknesses like associated leakage paths.

OBJECTIVE OF THE INVENTION

The objective is to invent a top entry trunnion ball valve for safe in-line maintenance and method to do such maintenance.

Another objective is to invent the top entry trunnion ball valve for safe inline maintenance while no new leakage paths are formed.

Another objective is to invent a simple, cost effective and reliable ball seat retracting mechanism for a top entry trunnion ball valve.

Another objective is to invent a ball seat retracting mechanism by which in-line maintenance of ball seats is possible with high safety.

Yet another objective of the invention is to provide a ball seat retracting mechanism which does not require additional moving parts to be included in the ball member.

Yet another object of the invention is to provide ball seat retracting mechanism integral with the top entry trunnion mounted rotary ball valve which is free from the danger of losing any external detachable part.

Yet another objective of the invention is to provide a ball seat retracting mechanism for trunnion mounted rotary ball valve which can be actuated using a standard and simple tool.

Yet another optional objective of the invention is to provide ball seat retracting mechanism which can be only actuated using a specific tool.

Yet another objective is to invent the top entry trunnion ball valve for safe inline maintenance such that the ball valve cannot be operated if any of the ball seats are in retracted position.

Yet another object is to invent the ball seat retraction mechanism that should be inoperative during normal working condition of the rotary ball valve.

SUMMARY OF THE INVENTION

A top entry trunnion mounted rotary ball valve having a main valve body. A valve top cover is connected to the main valve body. There is provided a stepped upstream recess for accommodating an upstream ball seat assembly in an inlet flow passage, and a stepped downstream recess for accommodating a downstream ball seat assembly in an outlet flow passage. A ball member having a central bore is provided. A lower trunnion, mounted below the ball member, is disposed in a lower bore in the main valve body. An upper trunnion, mounted above the ball member is disposed in an upper bore in the valve top cover. A lower stem end of a stem engages with a slot of the ball member. The stem extends outwards through an opening in the valve top cover.

The upstream and the downstream ball seat assemblies, each, comprise a soft insert seal, a ball seat, a seat retainer and a plurality of compression springs in between the ball seat and the seat retainer. The seat retainer is disposed rigidly in the stepped upstream recess in the valve body. The seat retainer has a plurality of spring locators in the form of cavities or projections wherein or whereon the plurality of compression springs is provided. The upstream and the downstream ball seat assemblies may have few more components like O-rings, spring covers, et cetera.

On a cylindrical surface of each of the ball seats is provided a plurality of seal grooves and a sealant groove. A tubular cavity for disposing the soft insert seal is provided on a ball end of the ball seat. When the rotary ball valve is open, the soft insert seal of the upstream ball seat assembly as well as the soft insert seal of the downstream ball seat assembly presses against a sealing surface of the ball member due to an opposing force Fc of the compression springs.

To remove or assemble the ball member, a mechanical clearance is necessary between the ball member and the soft insert seal, so that the ball member can be taken out or in after removing the valve top cover. In order to create the mechanical clearance, each of the ball seats are required to retract against the opposing force Fc of the compression springs.

There is provided a guiding groove on the cylindrical surface of each of the ball seats. The guiding groove has a groove depth and a groove width. A first end of the guiding groove is in the vicinity of a flange on the ball end of the ball seat, while a second end of the guiding groove is at an axial distance, along a flow axis, equal to or more than the measure of retraction required so as to get the mechanical clearance, adequate to remove the ball member. The second end of the guiding groove has a diverging width construction which eases the engagement of a guide assembly. The angular span between the first end and the second end of the guiding groove can be less than 180 degrees or more than 360 degrees, depending on the overall size of rotary ball valve.

Also provided is a plurality of engaging holes on an outer periphery of a flange on each of the ball seat. The engaging holes are equally spaced from one another and a radial axis of each engaging hole is orthogonal to the flange of the ball seat. The engaging holes are on the entire outer periphery of the flange or only on part of the outer periphery depending on the size of rotary ball valve, and shall be explained further later.

In the main valve body, there is provided a threaded through-hole, on each of an upper surface of an inner wall of the main valve body, on the other side of which is provided the stepped upstream recess for accommodating the upstream ball seat assembly, also the stepped downstream recess for accommodating the downstream ball seat assembly. The threaded through-hole is such located that a head of a compatible screw when engaged in the threaded through-hole is easily and clearly accessible from top of the ball valve after dismantling the valve top cover.

The rotary ball valve as per present invention has at least two guide assemblies, each guide assembly having a guide screw and a freely rotating bearing fitted at a far end of the guide screw. The overall diameter of the freely rotating bearing is less than the shank diameter of the guide screw. A guide height of the guide assembly is such that when the guide assembly is tightened in the threaded through-hole, a bearing face of the freely rotating bearing does not touch a groove surface on the guiding groove of the ball seat.

Under normal functioning of the rotary ball valve, there is no use of the guide assembly and the guide assembly is securely assembled in a parking hole provided on an inside of the valve top cover or an inside of the valve main body. A depth of the parking hole is higher than a guide height of the guide assembly, so that the freely rotating bearing fitted at the far end of the guide assembly is not damaged while the guide assembly is engaged in the parking hole.

When the ball member or any other part provided inside the ball valve needs to be attended to, after removing the valve top cover the guide assembly is disengaged from the parking hole and engaged in the threaded through-hole. The guide assembly is tightened fully.

A straight rod is engaged in engaging holes of the flange of either ball seat which is accessible from the top side and the straight rod is turned in the direction shown by an arrow, by a tangential force Ft, till a next engaging hole becomes accessible. The straight rod is then engaged in the next accessible hole and such steps are repeated till it is possible and or a mechanical clearance between a soft insert seal and a sealing surface of the ball member is attained by retracting in of the ball seat against a force Fc of the compression springs. The straight rod is, likewise, engaged in an accessible engaging hole of the flange of the other ball seat accessible and turned in the marked direction by a tangential force Ft till a next engaging hole becomes accessible. The straight rod is then engaged in the next accessible hole and such steps are repeated till it is possible and or a mechanical clearance between a soft insert seal and a sealing surface of a ball member is attained by retracting in of the other ball seat against a force Fc of the compression springs.

Alternatively, two straight rods are engaged one each in an engaging hole of the flange of each of the ball seats which are accessible from the top side and the straight rods are simultaneously turned in the direction shown by respective arrows, by a tangential force Ft, till a next engaging hole becomes accessible. The straight rods are then engaged in the next accessible holes and such steps are repeated till it is possible and or a mechanical clearance between a soft insert seal and a sealing surface of the ball member is attained by retracting in of the ball seat against a force Fc of the compression springs.

The ball member is then removed, repaired or replaced and re-assembled.

By following a reverse process, the ball seats are retracted out, either to bring the ball seats in the sealing position or to remove the ball seats or other internal components for repair and maintenance.

In order to ensure that the force Ft is appliable comfortably by one person of normal physique, an angle of groove α, which is the angle between the flange and the guiding groove, is kept lower, which would imply that the angular span of guiding groove would have to be higher so that the required axial distance, which is equal to or more than the measure of retraction required so as to get the mechanical clearance adequate to remove the ball member, is attainable between the first end of the groove and the second end of the groove.

In the event that, after completion of maintenance and repair work, if the maintenance person forgets to disengage and remove the guide assembly from the threaded through-hole, a head of the guide assembly shall have a mechanical interference with the valve top cover and it shall not be possible to fix the valve top cover while the guide assembly is still engaged with the threaded through-hole.

The engaging holes are circular in shape or alternatively of a specific shape like a star or an oblong shape. Correspondingly, the straight rod is either a simple circular rod or a straight rod of corresponding specific profile.

BRIEF DESCRIPTION OF DRAWINGS

FIG. 7 is a perspective view and a partially magnified view of a ball seat; also representatively showing on a common axis an angular span between a first end and a second end of a guiding groove, while

FIG. 11B is a side view of the ball seat in a retracted out position or a sealing position and the guide assembly engaged in the guiding groove, while

DETAILED DESCRIPTION OF THE INVENTION

A preferred embodiment of present invention is described with the aid of the drawings. Several variations of present invention are possible and therefore the description of the embodiments should not be construed to limit the scope of this invention in any manner.

Figure 1:
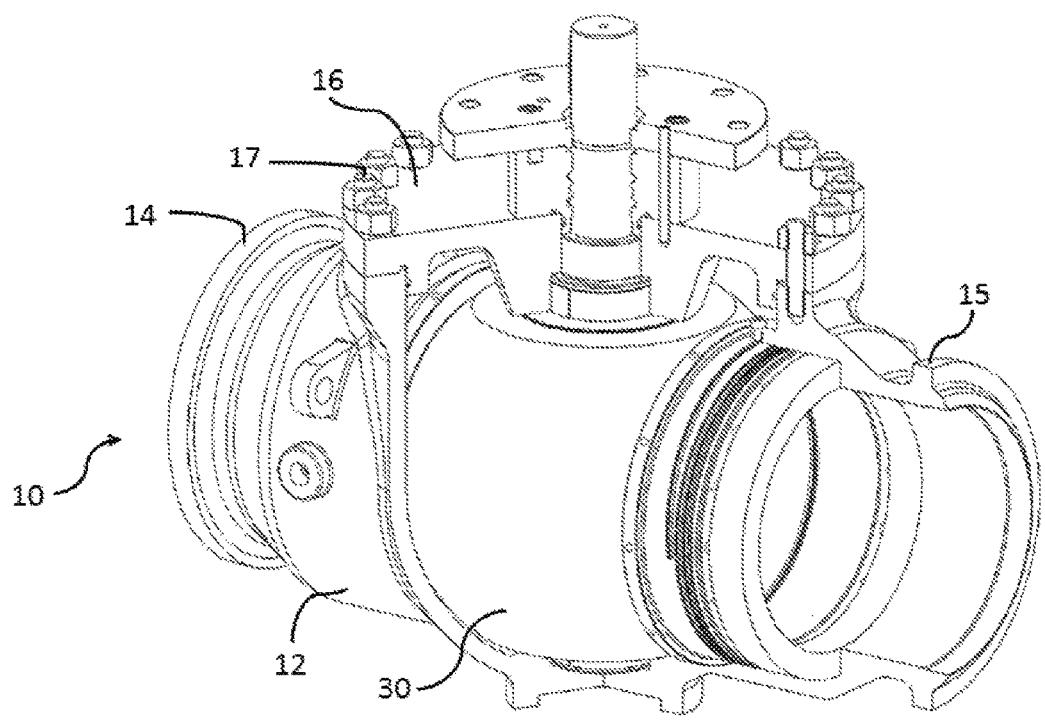
FIG. 1 is a partial section of a top entry trunnion mounted rotary ball valve as per present invention.
Figure 2:
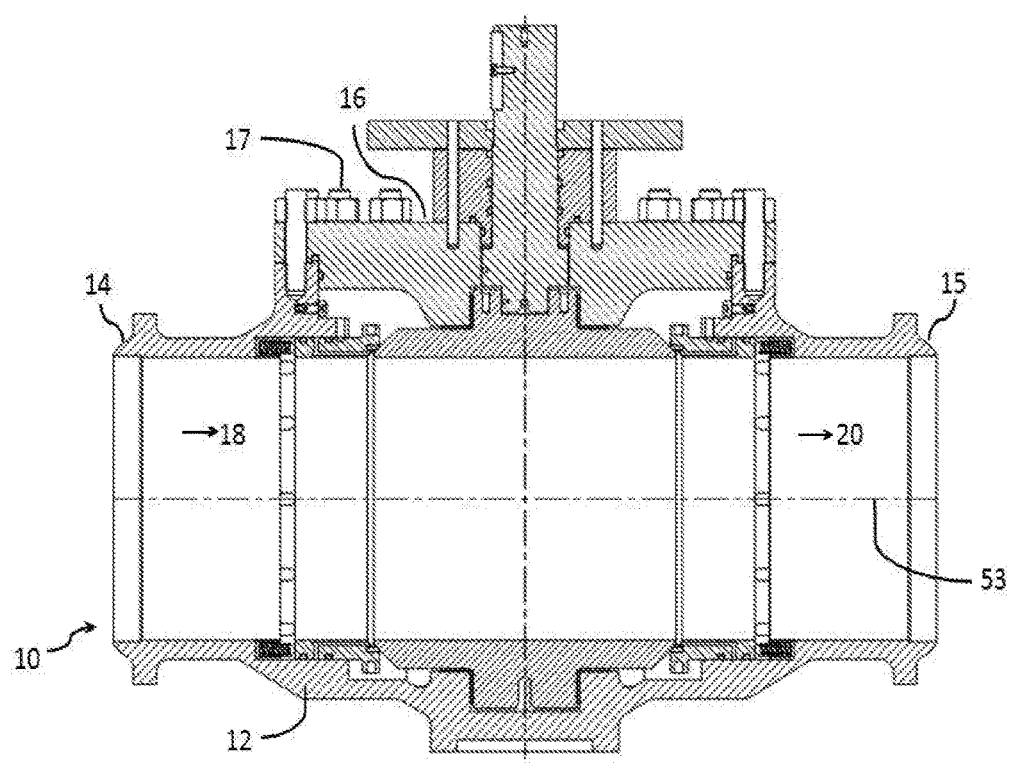
FIG. 2 is a sectional front view of the top entry trunnion mounted rotary ball valve.
Figure 3:
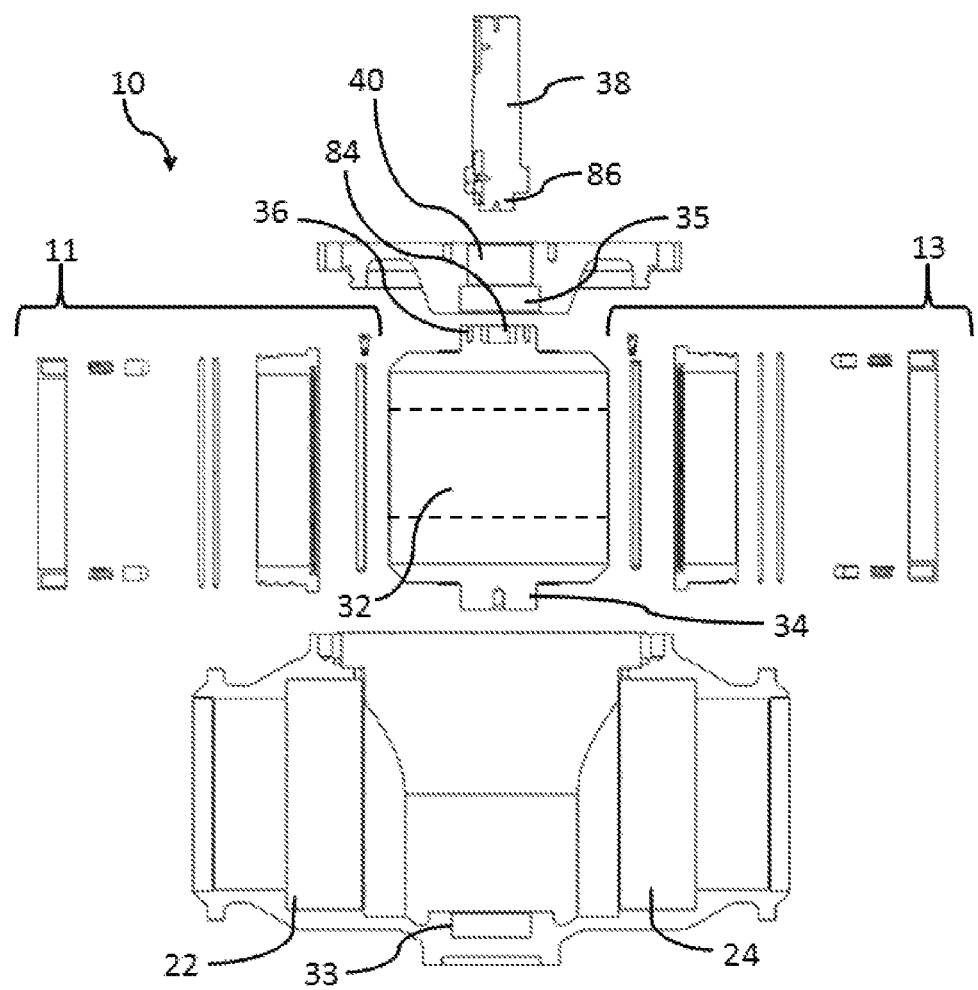
FIG. 3 is an exploded sectional view of the top entry trunnion mounted rotary ball valve showing parts needed to be described in present invention.

FIG. 1, FIG. 2 and FIG. 3, a top entry trunnion mounted rotary ball valve 10 having a main valve body 12, the main valve body 12 having end connections 14, 15 which are connected to a flow pipe line (not shown). The end connections 14, 15 may be connected to the flow pipe line by bolts or by interference fitment or by any other known method and the end connections 14, 15 shall have commensurate construction, not described here. A valve top cover 16 is connected to the main valve body 12 by using a plurality of studs 17. There is an inlet flow passage 18 and an outlet flow passage 20. There is provided a stepped upstream recess 22 for accommodating an upstream ball seat assembly 11 in the inlet flow passage 18, and a stepped downstream recess 24 for accommodating a downstream ball seat assembly 13 in the outlet flow passage 20. A ball member 30 having a central bore 32 is provided. A lower trunnion 34, mounted below the ball member 30, is disposed in a lower bore 33 in the valve body 12. An upper trunnion 36, mounted above the ball member 30 is disposed in an upper bore 35 in the valve top cover 16. A lower stem end 86 of a stem 38 engages with a slot 84 of the ball member 30. The stem 38 extends outwards through an opening 40 in the valve top cover 16.

Figure 4:
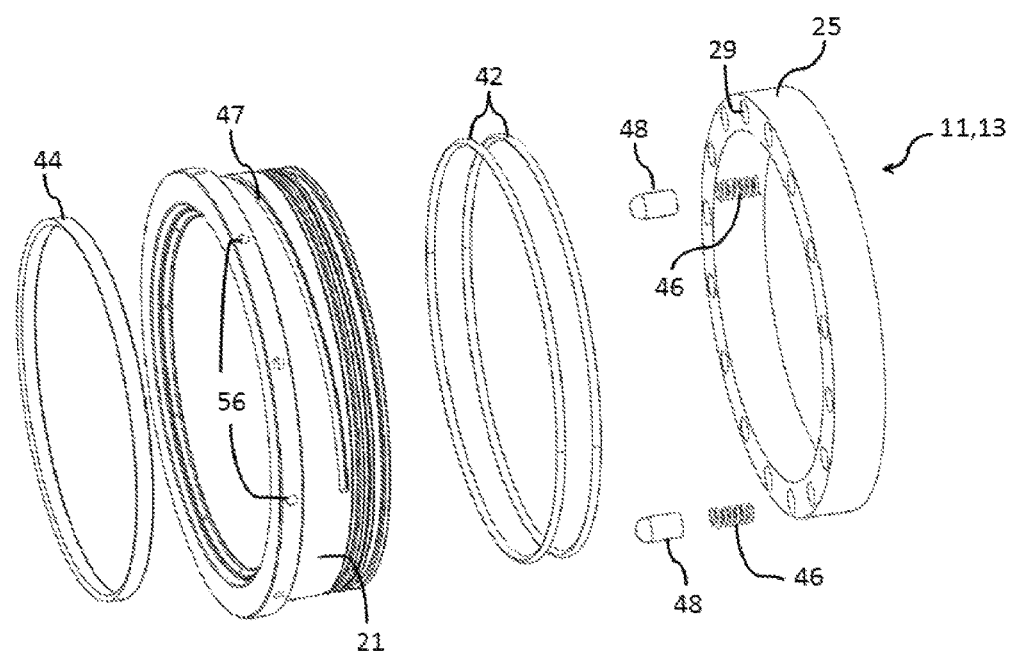
FIG. 4 is an exploded perspective view of an upstream/a downstream ball seat assembly.

FIG. 4, the upstream ball seat assembly 11 comprises a soft insert seal 44, a ball seat 21, a seat retainer 25 and a plurality of compression springs 46 in between the ball seat 21 and the seat retainer 25. The seat retainer 25 is disposed rigidly in the stepped upstream recess 22 in the valve body 12. The seat retainer 25 has a plurality of spring locators 29 in the form of cavities or projections wherein or whereon the plurality of compression springs 46 is provided. The upstream ball seat assembly 11 may have few more components like O-rings 42, spring covers 48, et cetera.

The downstream ball seat assembly 13, likewise, comprises a soft insert seal 44, ball seat 21, a seat retainer 25 and a plurality of compression springs 46 in between the ball seat 21 and the seat retainer 25. The seat retainer 25 is disposed rigidly in the stepped downstream recess 24 in the valve body 12. The seat retainer 25 has a plurality of spring locators 29 in the form of cavities or projections wherein or whereon the plurality of compression springs 46 is provided. The downstream ball seat assembly 13 may have few more components like O-rings 42, spring covers 48, et cetera.

Figure 5:
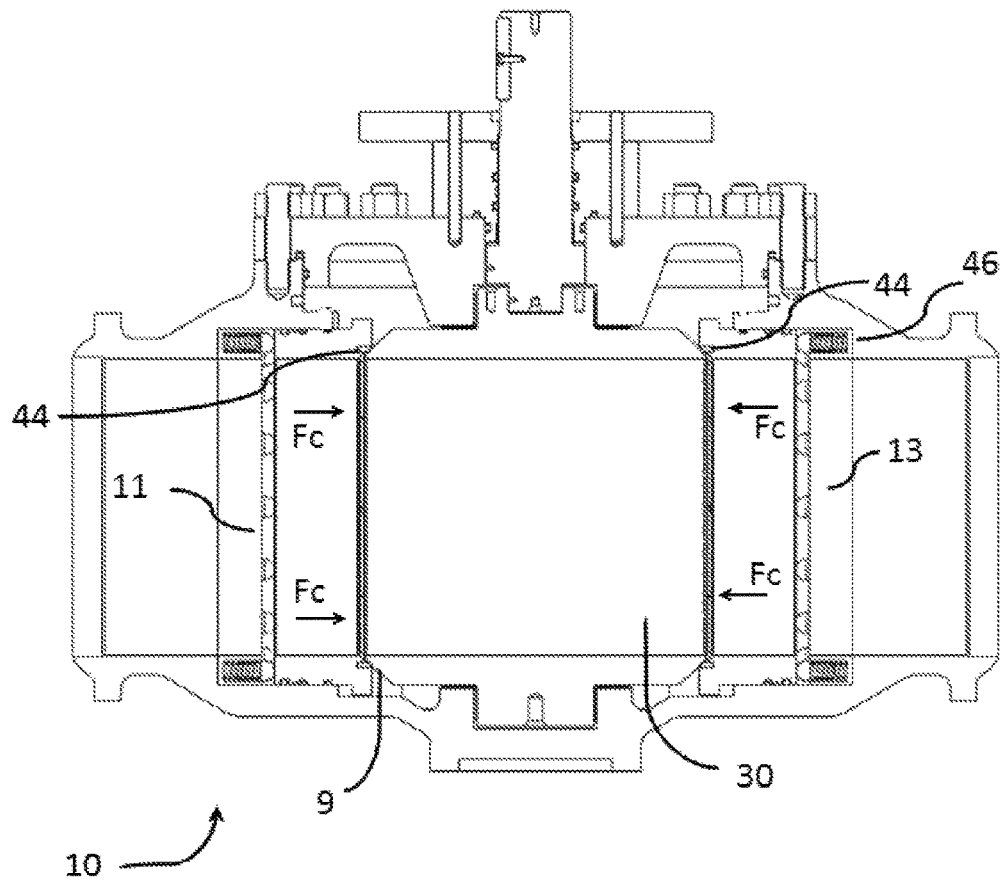
FIG. 5 is a sectional front view showing a ball member in a valve open condition.
Figure 7:
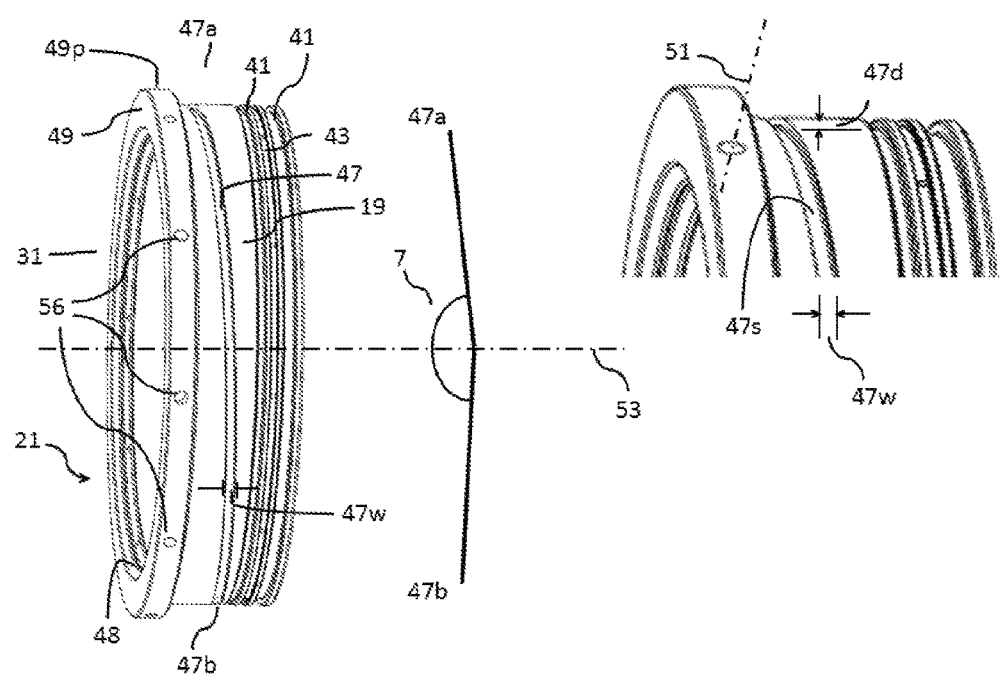

FIG. 7, on a cylindrical surface 19 of each of the ball seats 21 is provided a plurality of seal grooves 41 and a sealant groove 43 in between the seal grooves 41. A tubular cavity 48 for disposing the soft insert seal 44 is provided on a ball end 31 of the ball seat 21. When the rotary ball valve 10 is open, the soft insert seal 44 of the upstream ball seat assembly 11 as well as the soft insert seal 44 of the downstream ball seat assembly 13 presses against a sealing surface 9 of the ball member 30 due to an opposing force Fc of the compression springs 46. FIG. 5.

Figure 6:
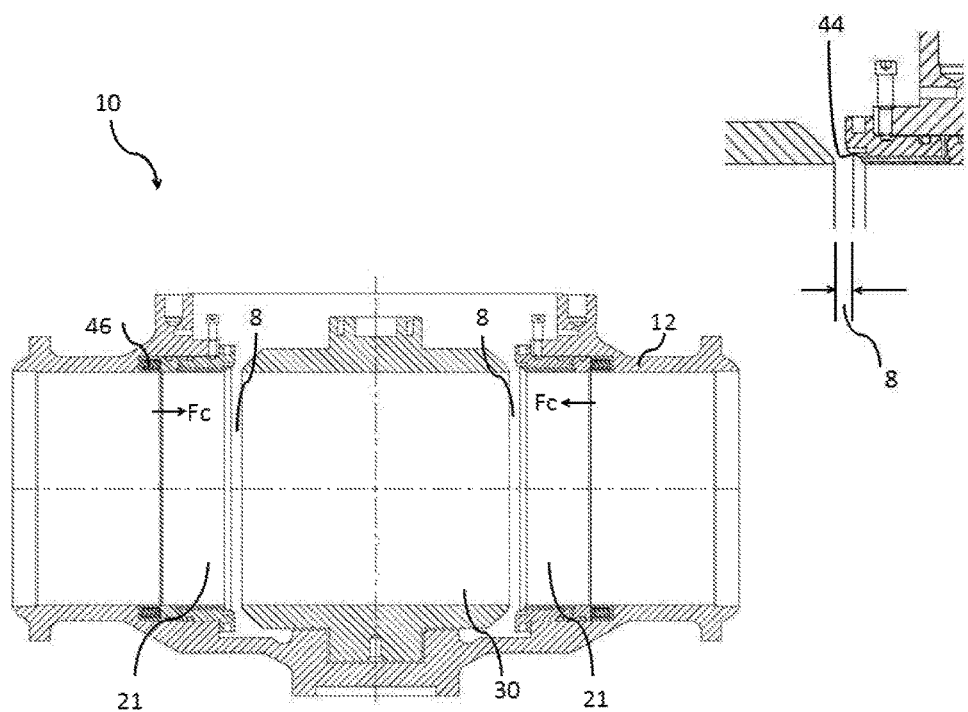
FIG. 6 is a sectional front view showing the ball member in valve open condition and ball seats retracted, with an enlarged view of a mechanical clearance.

FIG. 6, to assemble or remove the ball member 30, a mechanical clearance 8 is necessary between the ball member 30 and the soft insert seal 44, so that the ball member 30 can be taken out after removing the valve top cover 16. In order to create the mechanical clearance 8, each of the ball seats 21 are required to retract against the opposing force Fc of the compression springs 46.

Figure 7A:
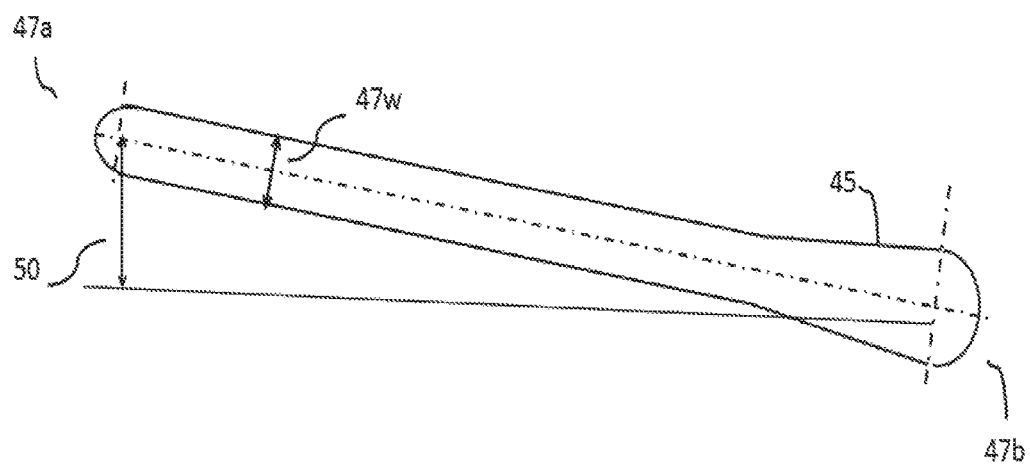
FIG. 7A is a hypothetical linear view of the guiding groove.

FIGS. 7 and 7A, there is provided a guiding groove 47 on a cylindrical surface 19 of each of the ball seats 21. The guiding groove 47 has a groove depth 47d and a groove width 47w. A first end 47a of the guiding groove 47 is in the vicinity of a flange 49 on the ball end 31 of the ball seat 21, while a second end 47b of the guiding groove 47 is at an axial distance 50 along a flow axis 53, equal to or more than the measure of retraction required so as to get the mechanical clearance 8, adequate to remove or assemble the ball member 30. The second end 47b of the guiding groove 47 has a diverging width construction 45 which eases the engagement of a guide assembly 55. The angular span 7 between the first end 47a and the second end 47b of the guiding groove 47 can be less than 180 degrees or more than 360 degrees, depending on the overall size of rotary ball valve 10, in order to be able to manually retract in and retract out the ball seats 21, as shall be explained further later.

FIG. 7, also provided is a plurality of engaging holes 56 on an outer periphery 49p of a flange 49 on each of the ball seat 21. The engaging holes 56 are equally spaced from one another and a radial axis 51 of each engaging hole 56 is orthogonal to the flange 49 of the ball seat 21. The engaging holes 56 are on the entire outer periphery 49p of the flange 49 or only on part of the outer periphery 49p depending on the size of rotary ball valve 10, and shall be explained further later. A direction of rotation for retracting in the ball seat 21 is marked on the flange 49.

Figure 8:
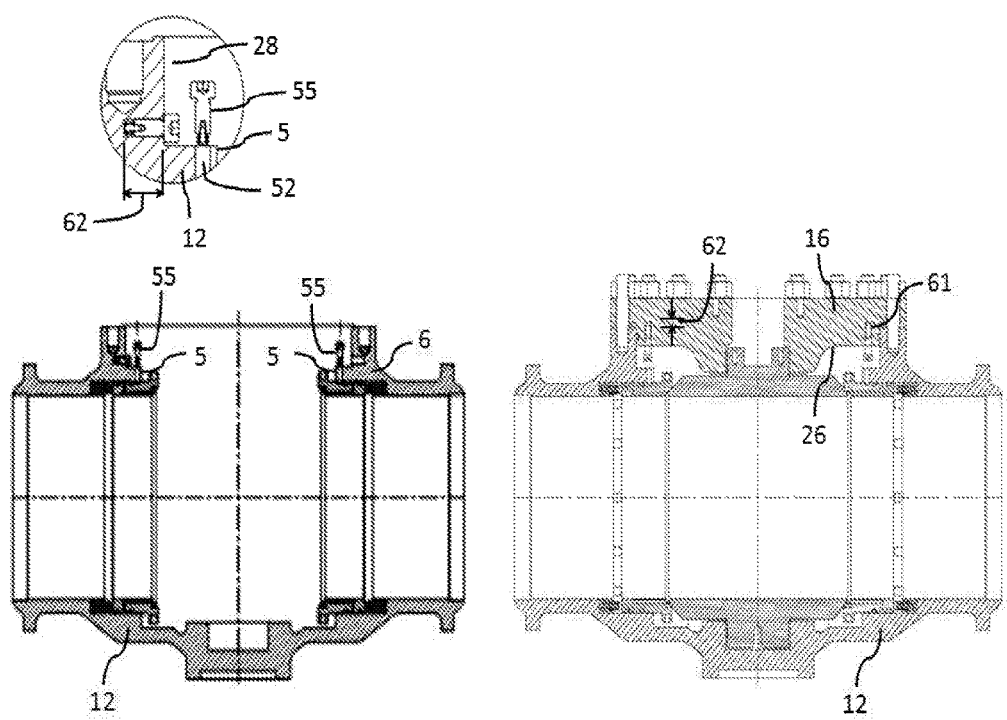
FIG. 8 is a sectional front view of a threaded through-hole on the valve main body and a plurality of parking holes on a valve main body and a valve top cover.

FIG. 8, in the main valve body 12, there is provided a threaded through-hole 52, on each of an upper surface 5 of an inner wall 6 of the main valve body 12, on the other side of which is provided the stepped upstream recess 22 for accommodating the upstream ball seat assembly 11, also the stepped downstream recess 24 for accommodating the downstream ball seat assembly 13. The threaded through-hole 52 is such located that a head of a compatible screw when engaged in the threaded through-hole 52 is easily and clearly accessible from top of the rotary ball valve 10 after dismantling the valve top cover 16.

Figure 9:
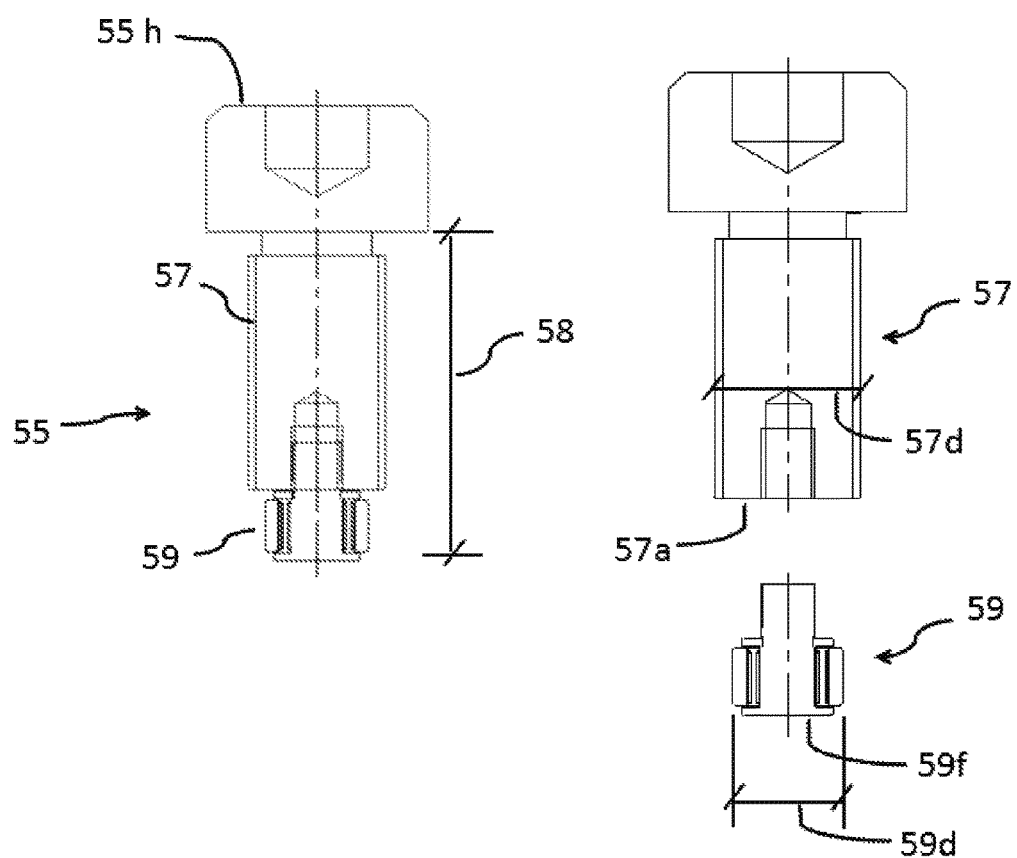
FIG. 9 shows sectional views of a guide assembly and its parts.

FIG. 9, the rotary ball valve 10 as per present invention has a guide assembly 55 having a guide screw 57 and a freely rotating bearing 59 fitted at a far end 57a of the guide screw 57. The overall diameter 59d of the freely rotating bearing 59 is less than the shank diameter 57d of the guide screw 57. A guide height 58 of the guide assembly 55 is such that when the guide assembly 55 is tightened in the threaded through-hole 52, a bearing face 59f of the freely rotating bearing 59 does not touch a groove surface 47s, shown in FIG. 7, on the guiding groove 47 of the ball seat 21. At least two guide assemblies 55 are provided with the rotary ball valve 10.

Under normal functioning of the rotary ball valve 10, there is no use of the guide assemblies 55 and each of the guide assemblies 55 are securely assembled in respective parking hole 61 provided on an inside 26 of the valve top cover 16 or the inside 28 of the valve main body 12. There are at least two parking holes 61 in the main valve body 12 or in the valve tope cover 16, or both. A depth 62 of the parking hole 61 is higher than a guide height 58 of the guide assembly 55, so that the bearing face 59f of the freely rotating bearing 59 fitted at the far end 57a of the guide assembly 55 is not damaged while the guide assembly 55 is engaged in the parking hole 61. FIG. 8.

When the ball member 30 or any other part provided inside the rotary ball valve 10 needs to be attended to, after removing the valve top cover 16, each of the two guide assemblies 55 are disengaged from the respective parking holes 61 and engaged in the respective threaded through-holes 52. Each guide assembly 55 is tightened fully in the threaded through-hole 52.

Figure 10:
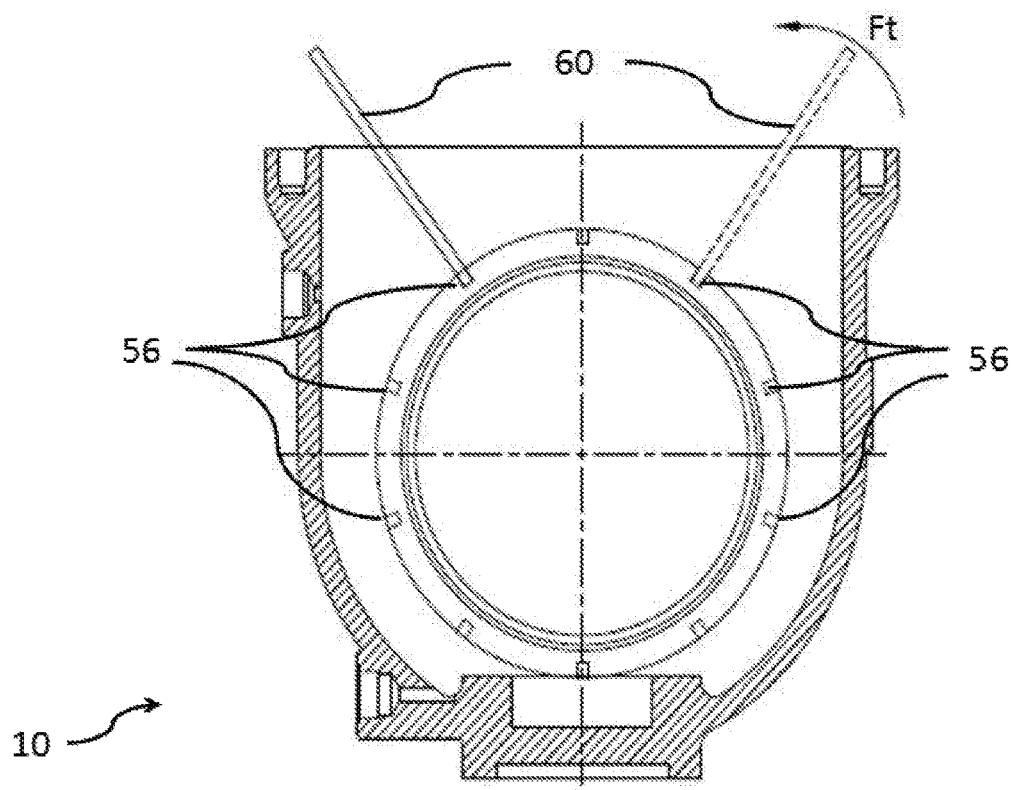
FIG. 10 is a sectional side view of the trunnion mounted rotary ball valve with the ball seat being retracted in or retracted out using a straight rod.

FIG. 10, a straight rod 60, of a cross sectional dimension slightly less than a cross sectional dimension of the plurality of engaging holes 56, is engaged in an engaging holes 56 of the flange 49 of either ball seat 21 which is accessible from the top side and the straight rod 60 is turned in the direction shown by an arrow, by a tangential force Ft, till a next engaging hole 56 becomes accessible. The straight rod 60 is then engaged in the next accessible hole and such steps are repeated till it is possible, that is until the first end of the guiding groove 47 reaches the guide assembly 55, and or a mechanical clearance 8 between a soft insert seal 44 and the sealing surface 9 of the ball member 30 is attained by retracting-in of the ball seat 21 against a force Fc of the compression springs 46. The straight rod 60 is, likewise, engaged in an accessible engaging hole 56 of the flange 49 of the other ball seat 21 accessible and turned in the marked direction by a tangential force Ft till a next engaging hole 56 becomes accessible. The straight rod 60 is then engaged in the next accessible hole and such steps are repeated till it is possible, that is until the first end of the guiding groove 47 reaches the guide assembly 55, and or a mechanical clearance 8 between a soft insert seal 44 and a sealing surface 9 of a ball member 30 is attained by retracting-in of the other ball seat 21 against the force Fc of the compression springs 46.

Alternatively, two straight rods 60, of a cross sectional dimension slightly less than a cross sectional dimension of the plurality of engaging holes 56, are engaged in an engaging hole 56 of the flange 49 of each of the ball seats 21 which are accessible from the top side and the straight rods 60 are simultaneously turned in the direction shown by respective arrows, by a tangential force Ft, till a next engaging hole 56 becomes accessible. The straight rods 60 are then engaged in the next accessible holes and such steps are repeated till it is possible, that is until the first end of the guiding groove 47 of the respective ball seats 21 reaches the guide assembly 55, and or a mechanical clearance 8 between a soft insert seal 44 and a sealing surface 9 of the ball member. 30 is attained by retracting-in of the ball seat 21 against a force Fc of the compression springs 46.

Figure 11A:
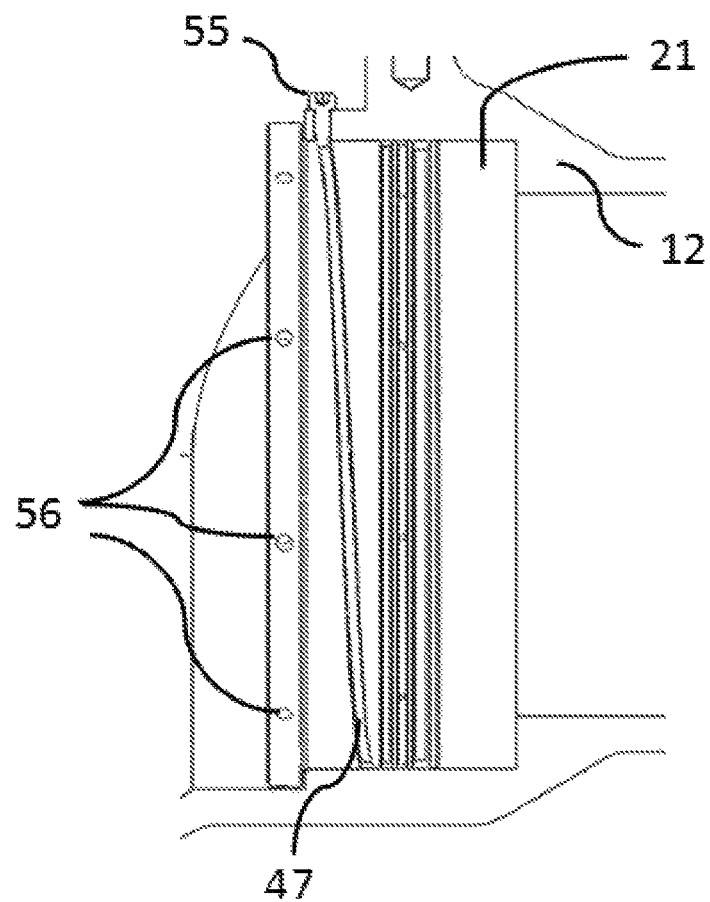
FIG. 11A is a side view of the ball seat in the retracted in position and the guide assembly engaged in the guiding groove.
Figure 11B:
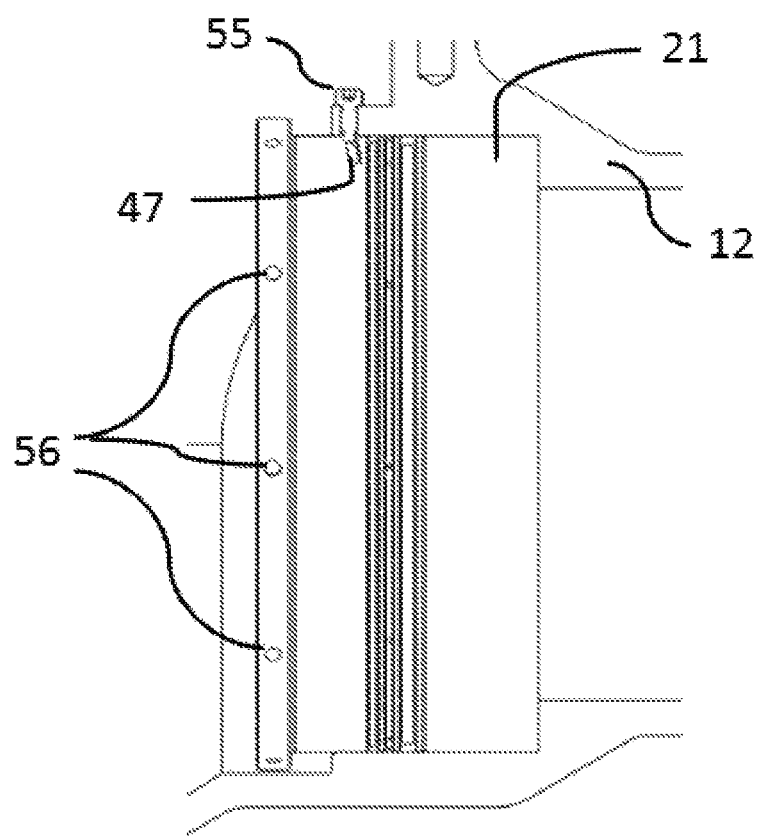
Figure 11C:
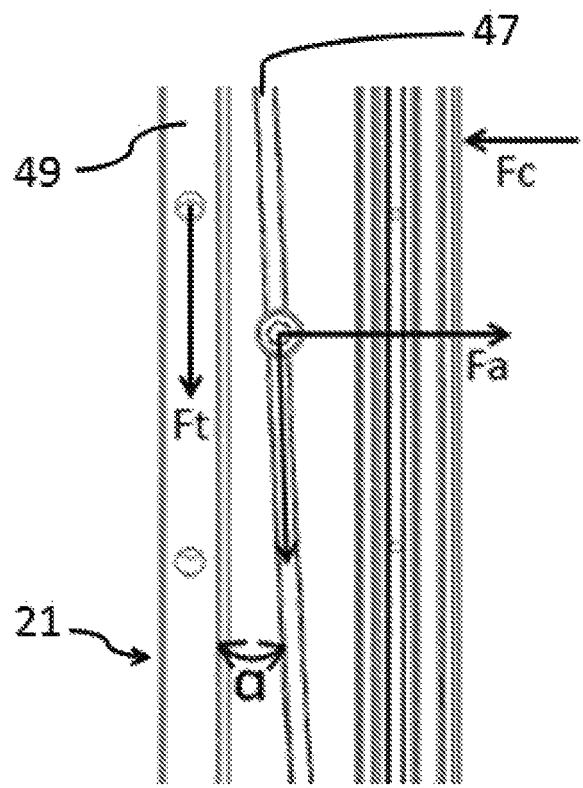
FIG. 11C shows an angle of groove and various forces.

The tangential force Ft causes an axial force Fa and the ball seat 21 moves with respect to the guide assembly 55, as shown in FIG. 11C, and thus the ball seat 21 retracts in the recess 22, 24 against an opposing force Fc of the compression springs 46, from a sealing position as shown in FIG. 11B to a retracted position as shown in FIG. 11A.

The ball member 30 is then removed or assembled.

Figure 12:
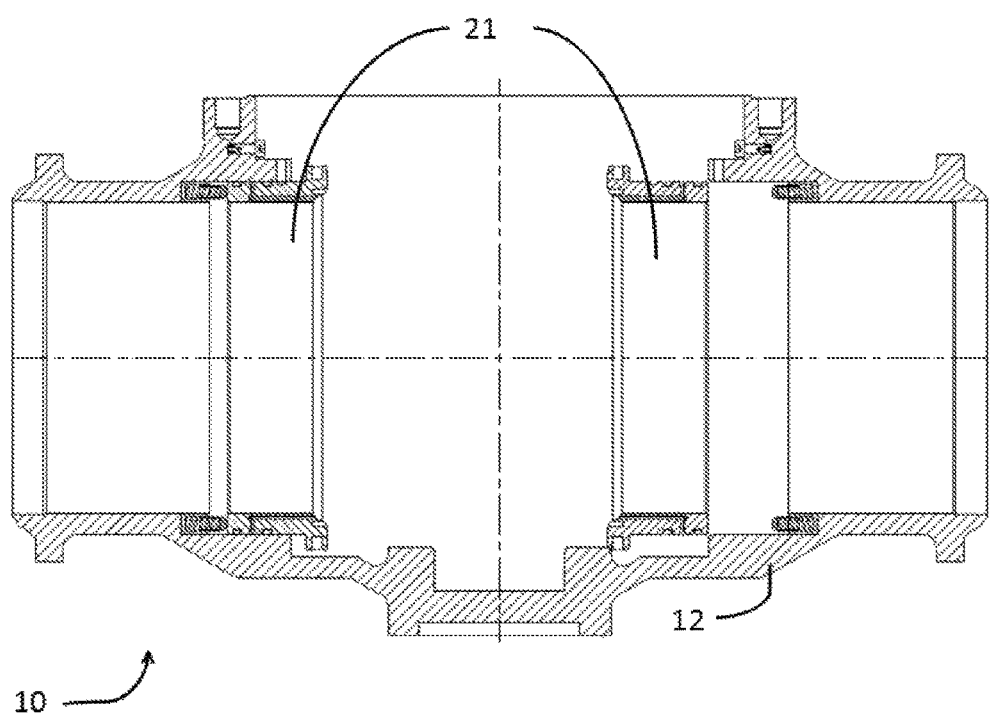
FIG. 12 is a sectional front view with the ball member removed and the seat balls retracted out.

By following a reverse process, the ball seats 21 are retracted out, either to bring the ball seats 21 in the sealing position or, as shown in FIG. 12, to remove the ball seats 21 or other internal components for repair and maintenance.

Importantly, for in-line maintenance of ball seats 21, the retracting out of the ball seats 21 by following the reverse process ensures gradual and controlled decompression of the compression springs resulting in high on-site safety.

FIG. 11C read with FIGS. 7 and 7A, an angle of groove α, which is the angle between the flange 49 and the guiding groove 47, has an inverse relationship with the angular span 7 of guiding groove 47 so that the required axial distance 50, which is equal to or more than the measure of retraction required so as to get the mechanical clearance 8 adequate to remove or assemble the ball member 30, is attainable with optimum force Ft. The angle of groove α is kept of relatively low value for big sized valves whence an angular span of guiding groove 47 becomes relatively higher so that the required axial distance 50 is attainable between the first end of the groove and the second end of the groove, by a force Ft appliable by a person of normal physique, and vice versa for a small sized valve.

In the event that, after completion of maintenance and repair work, if the maintenance person forgets to disengage and remove the guide assembly 55 from the threaded through-hole 52, a head 55h of the guide assembly 55 shall have a mechanical interference with an inside 26 of the valve top cover 16 and it shall not be possible to fix the valve top cover 16 while the guide assembly 55 is still engaged with the threaded through-hole 52. Thus, the possibility of operational use of the rotary ball valve 10 while the ball seats 21 might be in retracted situation is obviated.

The engaging holes 56 are circular in shape or alternatively of a specific shape like a star or an oblong shape. Correspondingly, the straight rod 60 is either a simple circular rod or a straight rod 60 of corresponding specific profile. Hence, while one user may select to have the rotary ball valve 10 with a facility to carry out in-line maintain without needing a special rod, the other user may select a valve which can be taken up for in-line maintenance when a specific rod is made available to the maintenance person by authorization.

The invention claimed is:

1. A method to facilitate an on-line maintenance on a top entry trunnion mounted rotary ball valve, the rotary ball valve comprising a main valve body having two threaded through-holes, a valve top cover connected to the main valve body by a plurality of studs, the valve top cover and or the main valve body having two parking holes, a ball member, an upstream ball seat assembly and a downstream ball seat assembly further comprising a soft insert seal, a ball seat, a seat retainer and a plurality of compression springs in between the ball seat and the seat retainer, a plurality of engaging holes on a flange on each of the ball seat, a guide assembly on each of the ball seat, the method to facilitate such maintenance comprising the steps of:
   a. removing a valve top cover by opening the plurality of studs;
   b. disengaging each of the two guide assemblies from respective parking holes;
   c. engaging and tightening each of the two guide assemblies in the respective threaded through-holes;
   d. engaging a straight rod in an accessible engaging hole of the flange of each of the ball seat and turning both the straight rods in the respective marked direction by a tangential force Ft till another engaging holes becomes accessible;
   e. engaging the straight rods in newly accessible holes and repeating the step till a first end of the guiding groove of each ball seat reaches the guide assembly and or a mechanical clearance between the soft insert seal and a sealing surface of the ball member is attained by retracting-in of the ball seats against a force Fc of the compression springs;
   f. removing or assembling the ball member from the main valve body;
   g. engaging the straight rod in an accessible engaging hole of the flange of each of the ball seat and turning both the straight rods in a reverse direction till another engaging holes becomes accessible; and
   h. engaging the straight rods in newly accessible holes and repeating the step till a second end of the guiding grooves of each ball seat reaches the guide assembly, by retracting-out the ball seats.

2. A method to facilitate an on-line maintenance on a top entry trunnion mounted rotary ball valve, the rotary ball valve comprising a main valve body having two threaded through-holes, a valve top cover connected to the main valve body by a plurality of studs, the valve top cover and or the main valve body having two parking holes, a ball member, an upstream ball seat assembly and a downstream ball seat assembly further comprising a soft insert seal, a ball seat, a seat retainer and a plurality of compression springs in between the ball seat and the seat retainer, a plurality of engaging holes on a flange on each of the ball seat, a guide assembly on each of the ball seat, the method to facilitate such maintenance comprising the steps of:
   a. removing the valve top cover by opening the plurality of studs;
   b. disengaging each of the two guide assemblies from respective parking holes;

c. engaging and tightening each of the two guide assemblies in the respective threaded through-hole;
d. engaging a straight rod in an accessible engaging holes of the flange of either ball seat and turning the straight rod in the marked direction by a tangential force Ft till another engaging hole becomes accessible;
e. engaging the straight rod in newly accessible hole and repeating the step till a first end of the guiding groove reaches the guide assembly and or a mechanical clearance between the soft insert seal and a sealing surface of the ball member is attained by retracting-in of the ball seat against a force Fc of the compression springs;
f. engaging the straight rod in an accessible engaging hole of the flange of the other ball sea and turning the straight rod in the marked direction by the tangential force Ft till another engaging hole becomes accessible;
g. engaging the straight rod in newly accessible hole and repeating the step till a first end of the guiding groove reaches the guide assembly and or the mechanical clearance between the soft insert seal and a sealing surface of the ball member is attained by retracting-in of the ball seat against the force Fc of the compression springs;
h. removing or assembling the ball member from the main valve body;
i. engaging the straight rod in an accessible engaging hole of the flange of either ball seat and turning the straight rod in the reverse direction by the tangential force Ft till another engaging hole becomes accessible;
j. engaging the straight rod in newly accessible hole and repeating the step till a second end of the guiding groove reaches the guide assembly, by retracting-out the ball seat;
k. engaging the straight rod in an accessible engaging hole of the flange of the other ball seat accessible and turning the straight rod in the reverse direction by the tangential force Ft till another engaging hole becomes accessible; and
l. engaging the straight rod in newly accessible hole and repeating the step till the second end of the guiding groove reaches the guide assembly, by retracting-out the ball seat.

3. The method to facilitate the on-line maintenance on the top entry trunnion ball valve as claimed in claim 2 or 1, wherein the retracting-out the ball seats enables removing the ball seats and or any component from inside the main valve body.

4. A top entry trunnion mounted rotary ball valve for safe in-line maintenance, comprising:
a. a main valve body having end connections;
b. a valve top cover connected to the main valve body by a plurality of studs;
c. an inlet flow passage and an outlet flow passage;
d. a stepped upstream recess for accommodating an upstream ball seat assembly in the inlet flow passage, and a stepped downstream recess for accommodating a downstream ball seat assembly in the outlet flow passage;
e. a ball member having a central bore;
f. the upstream ball seat assembly and the downstream ball seat assembly further comprises a soft insert seal, a ball seat, a seat retainer and a plurality of compression springs in between the ball seat and the seat retainer, the seat retainer disposed rigidly in the stepped upstream recess in the main valve body, the seat retainer having a plurality of spring locators in the form of cavities or projections wherein or whereon the plurality of compression springs is provided;
g. a plurality of seal grooves and a sealant groove on a cylindrical surface, a tubular cavity for disposing the soft insert seal, on each of the ball seat;
h. a guiding groove on the cylindrical surface of each of the ball seats, the guiding groove having a groove depth and a groove width, a first end of the guiding groove in a vicinity of a flange on a ball end of the ball seat, while a second end of the guiding groove at an axial distance equal to or more than a measure of retraction required so as to get a mechanical clearance, adequate to remove the ball member, the second end of the guiding groove having a diverging width construction which eases an engagement of a guide assembly, an angular span between the first end and the second end of the guiding groove can be less than 180 degrees or more than 360 degrees, depending on the overall size of the rotary ball valve, in order to be able to manually retract-in or retract-out the ball seats;
i. a plurality of engaging holes on an outer periphery of the flange on each of the ball seat, the engaging holes are equally spaced from one another, a radial axis of each engaging hole orthogonal to the flange of the ball seat, the engaging holes are on the entire outer periphery of the flange or only on part of the outer periphery depending on the size of the rotary ball valve;
j. a threaded through-hole, on each of an upper surface of an inner wall of the main valve body, on the other side of which is provided the stepped upstream recess for accommodating the upstream ball seat assembly, also the stepped downstream recess for accommodating the downstream ball seat assembly, the threaded through-hole is such located that a head of a compatible screw when engaged in the threaded through-hole is easily and clearly accessible from top of the ball valve after dismantling the valve top cover;
k. at least two guide assemblies, each guide assembly having a guide screw and a freely rotating bearing fitted at a far end of the guide screw, an overall diameter of the freely rotating bearing less than a shank diameter of the guide screw, a guide height of the guide assembly being such that when the guide assembly is tightened in the threaded through-hole, a bearing face of the freely rotating bearing does not touch a groove surface on the guiding groove of the ball seat;

the seat balls are retracted in the recess, by using a straight rod of a cross sectional dimension slightly less than a cross sectional dimension of the plurality of engaging holes, against a force Fc of the compression springs and the mechanical clearance is created between the ball member and the soft insert seal, to remove or assemble the ball member, the ball seats are retracted out either to bring the ball seats in a sealing position or for removing the ball seats and or any component from inside the main valve body, an angle of groove $\alpha$, which is the angle between the flange and the guiding groove, has an inverse relationship with the angular span of the guiding groove so that the required axial distance, which is equal to or more than the measure of retraction required so as to get the mechanical clearance adequate to remove the ball member, is attainable with an optimum force Ft, the angle of groove $\alpha$ being of relatively low value for big sized valves whence the angular span of the guiding groove becomes relatively higher so that the required axial distance is attainable between the first end of the groove and the second end of the groove, by applying a force Ft.

5. The top entry trunnion mounted rotary ball valve for safe in-line maintenance as claimed in claim 4, wherein the guide assembly having the head has mechanical interference with an inside of the valve top cover, disabling the possibility to fix the valve top cover while the guide assembly is still engaged with the threaded through-hole in the main valve body.

6. The top entry trunnion mounted rotary ball valve for safe in-line maintenance as claimed in claim 4, wherein each of the guide assembly is securely assembled in a parking hole provided on an inside of the valve main body under normal functioning of the rotary ball valve.

7. The top entry trunnion mounted rotary ball valve for safe in-line maintenance as claimed in claim 4, wherein each of the guide assembly is securely assembled in the parking hole provided on the inside of the valve top cover under normal functioning of the rotary ball valve.

8. The top entry trunnion mounted rotary ball valve for safe in-line maintenance as claimed in claim 4, wherein the parking hole has a depth higher than the guide height of the guide assembly, so that the bearing face of the freely rotating bearing fitted at the far end of the guide assembly is not damaged while the guide assembly is engaged in the parking hole.

9. The top entry trunnion mounted rotary ball valve for safe in-line maintenance as claimed in claim 4, wherein the engaging holes are circular in shape.

10. The top entry trunnion mounted rotary ball valve for safe in-line maintenance as claimed in claim 4, wherein the engaging holes are of a specific shape.

11. The top entry trunnion mounted rotary ball valve for safe in-line maintenance as claimed in claim 4, wherein the straight rod is either a circular rod or a rod of specific profile.

12. The method to facilitate the on-line maintenance on the top entry trunnion ball valve as claimed in claim 2 or 1, wherein the retracting-out the ball seats brings back the ball seats in a sealing position.

\* \* \* \* \*